(12) United States Patent
Zambetti et al.

(10) Patent No.: US 8,981,743 B2
(45) Date of Patent: Mar. 17, 2015

(54) CONSTANT-ON-TIME MULTI-PHASE SWITCHING VOLTAGE REGULATOR AND RELATED METHOD OF GENERATING A REGULATED VOLTAGE

(75) Inventors: Osvaldo Enrico Zambetti, Milan (IT); Daniele Giorgetti, Corbetta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 322 days.

(21) Appl. No.: 13/544,786

(22) Filed: Jul. 9, 2012

(65) Prior Publication Data
US 2013/0057242 A1    Mar. 7, 2013

(30) Foreign Application Priority Data

Sep. 5, 2011    (IT) .............................. MI2011A1592

(51) Int. Cl.
*H02M 3/158*    (2006.01)
*H02M 1/00*    (2006.01)
(52) U.S. Cl.
CPC .... *H02M 3/1584* (2013.01); *H02M 2001/0012* (2013.01)
USPC .......................................... 323/272; 363/70
(58) Field of Classification Search
CPC ............ H02M 3/1584; H02M 3/1588; H02M 2001/0025
USPC ................................ 323/272, 271; 363/69, 70
See application file for complete search history.

(56) References Cited

U.S. PATENT DOCUMENTS

| | | | |
|---|---|---|---|
| 6,362,608 B1 | 3/2002 | Ashburn et al. | |
| 2005/0184717 A1 | 8/2005 | Walters | |
| 2007/0108954 A1 | 5/2007 | Qiu et al. | |
| 2007/0229048 A1 | 10/2007 | Zambetti et al. | |
| 2008/0024104 A1 | 1/2008 | Yamada | |
| 2008/0129259 A1 | 6/2008 | Endo et al. | |
| 2010/0315052 A1 | 12/2010 | Zambetti et al. | |
| 2011/0084673 A1* | 4/2011 | Chang et al. .................. | 323/271 |

OTHER PUBLICATIONS

Julsereewong et al, "Buck Converter Controlled by Using Variable Switching Frequency Technique", Electron Devices and Solid-State Circuits, 2008. EDSSC 2008. IEEE International Conference On, IEEE, Piscataway, NJ, USA, Dec. 8, 2008 pp. 1-4.
Pengfei et al, "A 90 240 MHz Hysteretic Controlled DC-DC Buck Converter with Digital Phase Locked Loop Synchronization", IEEE Journal of Solid-State Circuits, IEEE Service Center, Piscataway, NJ, USA, vol. 46, No. 9, Sep. 1, 2011.

* cited by examiner

*Primary Examiner* — Harry Behm
*Assistant Examiner* — Matthew Grubb
(74) *Attorney, Agent, or Firm* — Seed IP Law Group PLLC

(57) ABSTRACT

A switching voltage regulator including a comparison module configured to receive a reference voltage and a feedback voltage and to generate a comparison signal corresponding to a difference between the reference voltage and the feedback voltage, an offset module configured to generate an offset signal based on a number of active phases of the voltage regulator, an adder configured to generate a control signal based on the comparison signal and the offset signal, a plurality of pulse-width-modulated (PWM) power stages, and a control module configured to control the plurality of PWM power stages based at least in part on the control signal generated by the adder.

29 Claims, 10 Drawing Sheets

CONSTANT-ON-TIME MULTI-PHASE SWITCHING VOLTAGE REGULATOR AND RELATED METHOD OF GENERATING A REGULATED VOLTAGE

BACKGROUND

1. Technical Field

This disclosure relates to switching voltage regulators and more particularly to an architecture of constant-on-time multi-phase switching voltage regulator.

2. Description of the Related Art

CPU for PCs, WORKSTATIONS and SERVERS typically need very sophisticated supply control mechanisms. These power supplies must typically meet high precision requirements both in stand-by conditions as well as in conditions of load transients. These requirements led to identify the well known architectures of multi-phase buck regulators as the most appropriate to this objective.

In order to effectively respond to very fast and large load transients (for example, in a CPU, up to 100 A or more in 50 ns) these converters typically employ nonlinear controls that are enabled in presence of load transients and turn on simultaneously all the available phases for sustaining the output voltage. These nonlinear systems advantageously minimize the response time by reacting in an "aggressive" manner to the load transient. Moreover, the multi-phase topologies have control mechanisms for limiting the unbalancing of phase currents thus ensuring a thermal balancing and preventing excessive stresses of components of the power stage (power MOS and inductors).

FIG. 1 shows a N-phase constant-on-time switching voltage regulator driven by a VCO, that generates a clock with adjustable frequency corresponding to the voltage provided to the VCO. A state machine STATE MACHINE distributes the clock pulses to the phases by generating as many phase clock signals CKi by frequency division of the clock signal CLOCK. The blocks TON_GEN_i are input with the respective phase clock signals CKi and with the sum between the output voltage VOUT and a voltage VCSi representing the unbalancing of each respective phase and determine, according to well known techniques, the respective phase duty-cycles DUTYi of the respective PWM voltages that supply the phase windings.

In order to make the output voltage VOUT track the reference voltage VREF and to nullify the error in steady-state conditions, an integrating network ZF is connected between the terminals COMP and FB of the switching regulator and a feedback impedance ZFB is connected between the output terminal OUT and the feedback terminal FB.

In constant-on-time multi-phase switching voltage regulators, when the current absorbed by the supplied load decreases, it is useful to reduce the number of active phases, for example from a number N to a number N-X, in order to reduce power dissipation and thus to increase the efficiency of the voltage regulator. This is done by reducing the voltage inputting the VCO, as shown in FIG. 2, in order to reduce the frequency of the clock signal provided to the state machine.

When the number of active phases is reduced (or increased), the voltage provided to the VCO decreases (increases) when the integrating network ZF discharges (charges) itself, that in the shown example is a RF-CF network, with a time constant determined by the capacitance CF and the resistance RF. As a consequence, the voltage provided to the VCO could vary slowly and cause out of specifications undershoots (overshoots) of the output regulated voltage VOUT.

BRIEF SUMMARY

Prior art nonlinear systems are affected by drawbacks during small load requests. Indeed, they have a fixed triggering threshold and may abruptly turn on all the available phases of the controller. Therefore, such nonlinear systems may not act when the load request is small in respect to the threshold or may act such to make the system respond in an aggressive fashion by turning on all the phases even when it was not necessary. The effect of this nonlinear control is even more evident when the load requests are close to the triggering threshold of the nonlinear system. In these cases, the nonlinear system may respond or even not react at all to small variations giving an undesired response of the load transient. In tests carried out in these conditions, with repeated load transients, large swings of the output voltage exceeding specifications of the regulated voltage were allowed.

The inventors have recognized that a method and architecture for enhanced constant-on-time switching voltage regulation that would allow varying the number of active phases without substantially causing overshoots or undershoots of the output regulated voltage is desired.

An embodiment of a constant-on-time multiphase voltage regulator comprises:
- an error amplifier EA adapted to receive on an input terminal the reference voltage VREF and on another input terminal a feedback voltage VFB available on a feedback terminal FB of the regulator, and to generate on a comparison terminal COMP a comparison voltage VCOMP corresponding to the difference between the reference voltage VREF and the feedback voltage VFB;
- a voltage controlled oscillator VCO coupled to the output of the error amplifier EA.

According to the applicant's findings, an embodiment of a multi-phase voltage regulator is able to significantly reduce overshoots and undershoots of the output voltage whenever one or more phases are turned on or off by controlling the VCO with a voltage corresponding to a sum of the comparison voltage with an offset voltage.

According to an embodiment of the method, the offset voltage is proportional to the regulated voltage and to the number of the currently active phases of the regulator and its value is updated each time a phase is turned on or off. An embodiment of a multi-phase voltage regulator of this disclosure comprises an adder for summing the comparison voltage value to the updated offset voltage value.

In an embodiment, a switching voltage regulator, adapted to generate a regulated voltage on an output terminal that tracks a reference voltage, comprises: an error amplifier adapted to receive on an input terminal said reference voltage and on another input terminal a feedback voltage available on a feedback terminal of the regulator, and to generate on a comparison terminal a comparison voltage corresponding to the difference between the reference voltage and the feedback voltage; an adder adapted to generate a control voltage as sum between said comparison voltage and an offset voltage; a voltage controlled oscillator controlled by said adder, adapted to generate a train of pulses at a frequency determined by said control voltage; a state machine connected such to be input with the train of pulses generated by said voltage controlled oscillator, adapted to generate for each of said active phase of the regulator a respective train of pulses obtained by frequency division by N of the input train of pulses; a plurality of generators of PWM pulses, each connected such to drive a respective PWM power stage adapted to supply with a constant-on-time a respective phase winding of the regulator adapted to generate said regulated output voltage on said output terminal. In an embodiment, the voltage regulator comprises a feedback impedance connected between said output terminal and said feedback terminal, and an integrating network connected between said feedback terminal and said comparison terminal.

In an embodiment, a method of generating a regulated voltage that tracks a reference voltage uses a constant-on-time switching voltage regulator comprising: an error amplifier adapted to receive on an input terminal said reference voltage and on another input terminal a feedback voltage available on a feedback terminal of the regulator, and to generate on a comparison terminal a comparison voltage corresponding to the difference between the reference voltage and the feedback voltage, an adder adapted to generate a control voltage as sum between said comparison voltage and an offset voltage, a voltage controlled oscillator controlled by said adder, adapted to generate a train of pulses at a frequency determined by said control voltage, a state machine connected such to be input with the train of pulses generated by said voltage controlled oscillator, adapted to generate for each of said active phase of the regulator a respective train of pulses obtained by frequency division by N of the input train of pulses, a plurality of generators of PWM pulses, each connected such to drive a respective PWM power stage adapted to supply with a constant-on-time a respective phase winding of the regulator adapted to generate said regulated output voltage on said output terminal, a feedback impedance connected between said output terminal and said feedback terminal, and an integrating network connected between said feedback terminal and said comparison terminal, the method comprising the steps of: generating said offset voltage proportionally to said output regulated voltage with a proportionality factor dependent from the number of active phases of the regulator and determined such to keep substantially constant the voltage drop on said integrating network when at least a phase of the regulator is turned on or off; adding said offset voltage to said comparison voltage to generate said control voltage; updating the value of said proportionality factor each time that at least a phase of the voltage regulator is turned on or off. In an embodiment, the method comprises the step of generating said offset voltage as the product between said output voltage and the number of active phases of the voltage regulator. In an embodiment, the method comprises the step of turning off a phase in the instant in which the current flowing throughout the respective winding nullifies.

In an embodiment, a switching voltage regulator comprises: a comparison module configured to receive a reference voltage and a feedback voltage and to generate a comparison signal corresponding to a difference between the reference voltage and the feedback voltage; an offset module configured to generate an offset signal based on a number of active phases of the voltage regulator; an adder configured to generate a control signal based on the comparison signal and the offset signal; a plurality of pulse-width-modulated (PWM) power stages; and a control module configured to control the plurality of PWM power stages based at least in part on the control signal generated by the adder. In an embodiment, wherein the comparison signal is a comparison voltage and the comparison module comprises an error amplifier configured to receive the reference voltage and the feedback voltage and to generate the comparison voltage. In an embodiment, the control signal is a control voltage, the offset signal is an offset voltage and the adder is configured to generate the control voltage as a sum of said comparison voltage and the offset voltage, wherein the control module comprises: a voltage controlled oscillator configured to generate a train of pulses at a frequency based on said control voltage; and a state machine configured to receive the train of pulses generated by said voltage controlled oscillator and to generate for each of active phase of the regulator a respective train of pulses obtained by frequency division of the received train of pulses. In an embodiment, the plurality of PWM power stages comprises: a plurality of generators of PWM pulses, each connected such to drive a respective PWM power stage to supply a respective phase winding of the regulator. In an embodiment, the switching voltage regulator comprises a feedback impedance connected between an output terminal of the regulator and a feedback terminal of the error amplifier, and an integrating network connected between said feedback terminal and an output terminal of the error amplifier. In an embodiment, the offset signal is an offset voltage and the offset module is configured to receive an output voltage of the switching voltage regulator and to generate the offset voltage. In an embodiment, the comparison module comprises: an analog-to-digital converter configured to receive the reference voltage and the feedback voltage; and a proportional-integral-derivative (PID) controller configured to receive an output of the analog-to-digital converter and to generate the comparison signal; and the control module comprises: an accumulator configured to generate a train of pulses at a frequency based on said control signal; and an interleaving oscillator configured to generate a plurality of pulse trains based on the train of pulses generated by the accumulator. In an embodiment, the offset module is configured to generate the offset signal based on the number of active phases of the voltage regulator, a gain of the accumulator and a switching frequency of the voltage regulator.

In an embodiment, a method comprises: generating a regulated voltage which tracks a reference voltage using a constant-on-time switching voltage regulator by: generating an offset signal based on a number of active phases N of the voltage regulator; generating a comparison signal based on the reference voltage and a feedback voltage; generating a control signal based on the offset signal and the comparison signal. In an embodiment, the offset signal is based on the regulated voltage output by the voltage regulator and the constant-on-time switching voltage regulator comprises: an error amplifier configured to receive on an input terminal said reference voltage and on another input terminal the feedback voltage available on a feedback terminal of the regulator, and to generate on a comparison terminal a comparison voltage corresponding to a difference between the reference voltage and the feedback voltage; an adder configured to generate a control voltage as sum of said comparison voltage and an offset voltage; a voltage controlled oscillator controlled by said adder, configured to generate a train of pulses at a frequency determined by said control voltage; a state machine configured to receive the train of pulses generated by said voltage controlled oscillator, and to generate for each of active phase of the regulator a respective train of pulses obtained by frequency division by N of the received train of pulses; a plurality of generators of PWM pulses, each configured to drive a respective PWM power stage; a feedback impedance connected between an output terminal and a feedback terminal of the error amplifier; and an integrating network connected between said feedback terminal and an output of the error amplifier. In an embodiment, the offset signal is an offset voltage proportionally to said regulated voltage with a proportionality factor based on the number of active phases of the regulator. In an embodiment, the proportionality factor is determined such to keep substantially constant a voltage drop on said integrating network when at least a phase of the regulator is turned on or off. In an embodiment, the method comprises updating the value of said proportionality factor each time that at least a phase of the voltage regulator is turned on or off. In an embodiment, the offset signal is a product of the regulated voltage and the number of active phases of the voltage regulator. In an embodiment, the method comprising turning off a phase in an instant in which a current flowing through a respective winding nullifies. In an embodiment, the voltage regulator comprises: an analog-to-digital converter configured to receive the reference voltage and the feedback voltage; a proportional-integral-derivative (PID) controller configured to receive an output of the analog-to-digital converter and to generate the comparison signal; an adder configured to generate the control signal based on the comparison signal and the offset signal; an accumulator configured to generate a train of pulses at a frequency based on said control signal; and an interleaving oscillator configured to generate a plurality of pulse trains based on the train of pulses generated by the accumulator. In an embodiment, the offset signal is inversely proportional to a gain of the accumulator and directly proportional to a switching frequency and the number of active phases of the voltage regulator.

In an embodiment, a system comprises: a processor; and a switching voltage regulator configured to provide power to the processor and including: a comparison module configured to receive a reference voltage and a feedback voltage and to generate a comparison signal corresponding to a difference between the reference voltage and the feedback voltage; an offset module configured to generate an offset signal based on a number of active phases of the voltage regulator; an adder configured to generate a control signal based on the comparison signal and the offset signal; a plurality of pulse-width-modulated (PWM) power stages; and a control module configured to control the plurality of PWM power stages based at least in part on the control signal generated by the adder. In an embodiment, the comparison signal is a comparison voltage and the comparison module comprises an error amplifier configured to receive the reference voltage and the feedback voltage and to generate the comparison voltage. In an embodiment, the control signal is a control voltage, the offset signal is an offset voltage, the adder is configured to generate the control voltage as a sum of said comparison voltage and the offset voltage, and the control module comprises: a voltage controlled oscillator configured to generate a train of pulses at a frequency based on said control voltage; and a state machine configured to receive the train of pulses generated by said voltage controlled oscillator and to generate for each of active phase of the regulator a respective train of pulses obtained by frequency division of the received train of pulses. In an embodiment, the system comprises a feedback impedance connected between an output terminal of the regulator and a feedback terminal of the error amplifier, and an integrating network connected between said feedback terminal and an output terminal of the error amplifier. In an embodiment, the offset module is configured to generate the offset signal by multiplying an output voltage of the switching voltage regulator by the number of active phases of the voltage regulator. In an embodiment, the comparison module comprises: an analog-to-digital converter configured to receive the reference voltage and the feedback voltage; and a proportional-integral-derivative (PID) controller configured to receive an output of the analog-to-digital converter and to generate the comparison signal. In an embodiment, the control module comprises: an accumulator configured to generate a train of pulses at a frequency based on said control signal; and an interleaving oscillator configured to generate a plurality of pulse trains based on the train of pulses generated by the accumulator. In an embodiment, the offset signal is inversely proportional to a gain of the accumulator and directly proportional to a switching frequency and number of active phases of the voltage regulator.

In an embodiment, a system comprises: means for generating an offset signal based on a number of active phases of a voltage regulator; means for generating a comparison signal based on a reference voltage and a feedback voltage; and means for generating a voltage regulator control signal based on the offset signal and the comparison signal. In an embodiment, the system further comprises a voltage controlled oscillator, wherein the means for generating the offset signal comprises a multiplier configured to multiply a voltage regulator output by the number of active phases. In an embodiment, the system further comprises an accumulator, wherein the means for generating the offset signal is configured to generate the offset signal based on a gain of the accumulator and a switching frequency of the voltage regulator.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, inductors, state machines, error amplifiers, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 3:
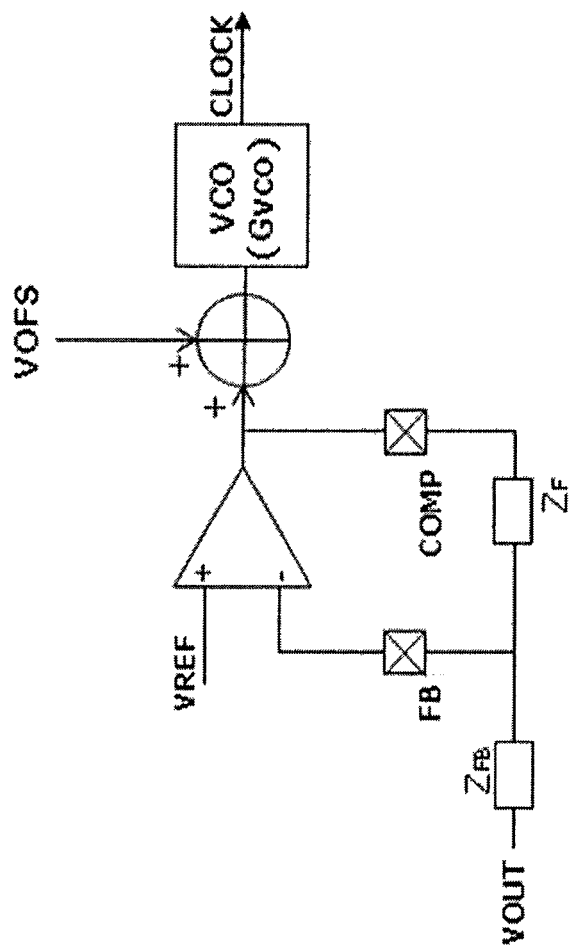
FIG. 3 shows an embodiment of an architecture of constant-on-time multiphase switching voltage regulator with an offset adder in input to the VCO.

FIG. 3 illustrates an embodiment of a voltage regulator comprising an adder configured to generate a control voltage as a sum of an offset voltage VOES with a comparison voltage, which facilitates faster response to changes in load conditions while reducing overshooting and undershooting of the regulated voltage.

Figure 4:
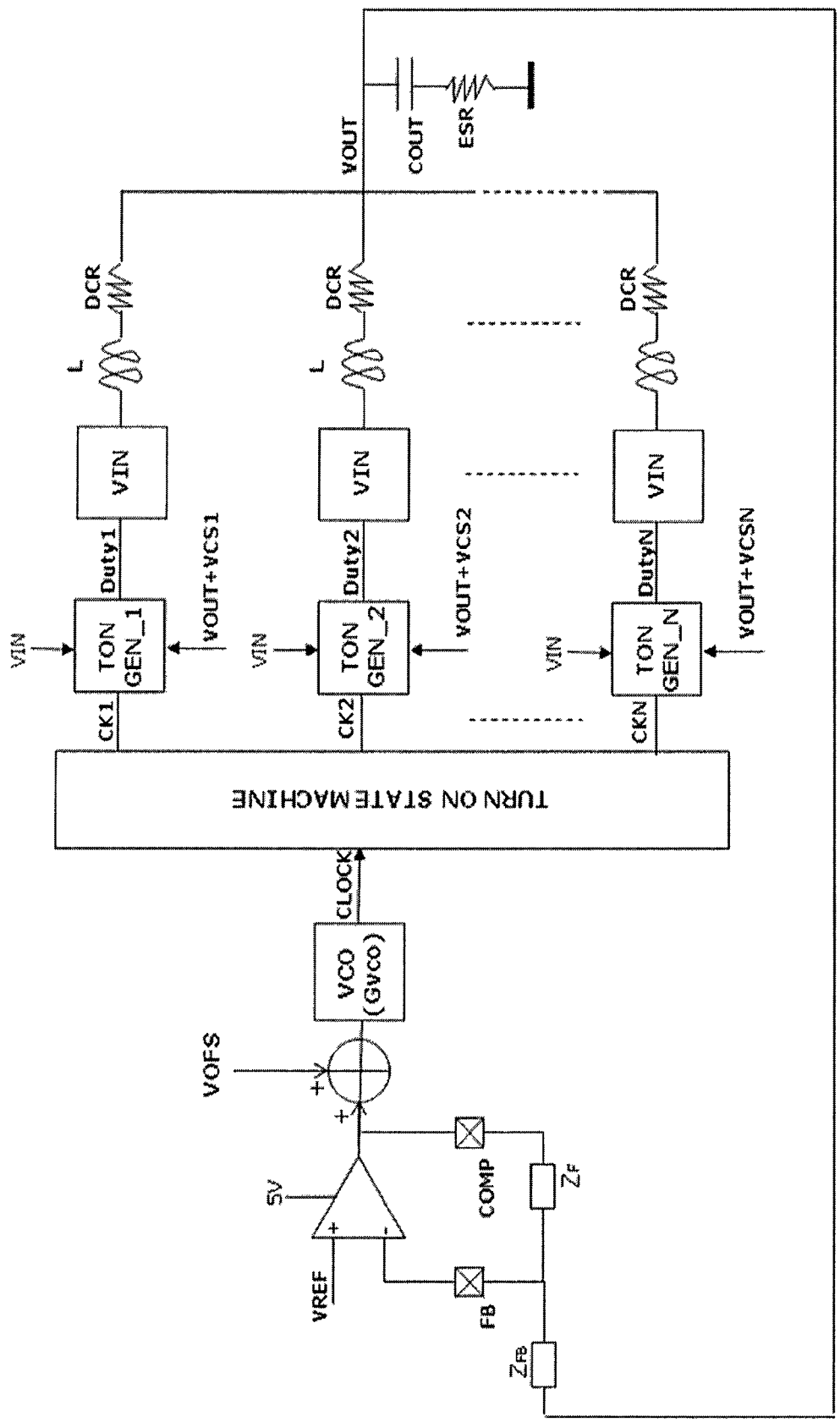
FIG. 4 is a detailed view of a portion of the architecture of a voltage regulator of FIG. 3.

When a phase of the constant-on-time voltage regulator should be turned on or off, in order to prevent that the response of the voltage regulator be slowed down by the integrating network ZF, according to an embodiment, the voltage provided to the VCO is corrected with an offset voltage VOFS, as better illustrated in the detailed view of FIG. 4.

The offset voltage VOFS may be determined as explained hereinafter, such to keep substantially constant the voltage drop on the network ZF, and is applied only when the voltage on the integrating network is susceptible of varying because of changed load conditions. To this end, the value of the offset voltage VOFS may be determined and the instant at which it to be applied identified.

Figure 1:
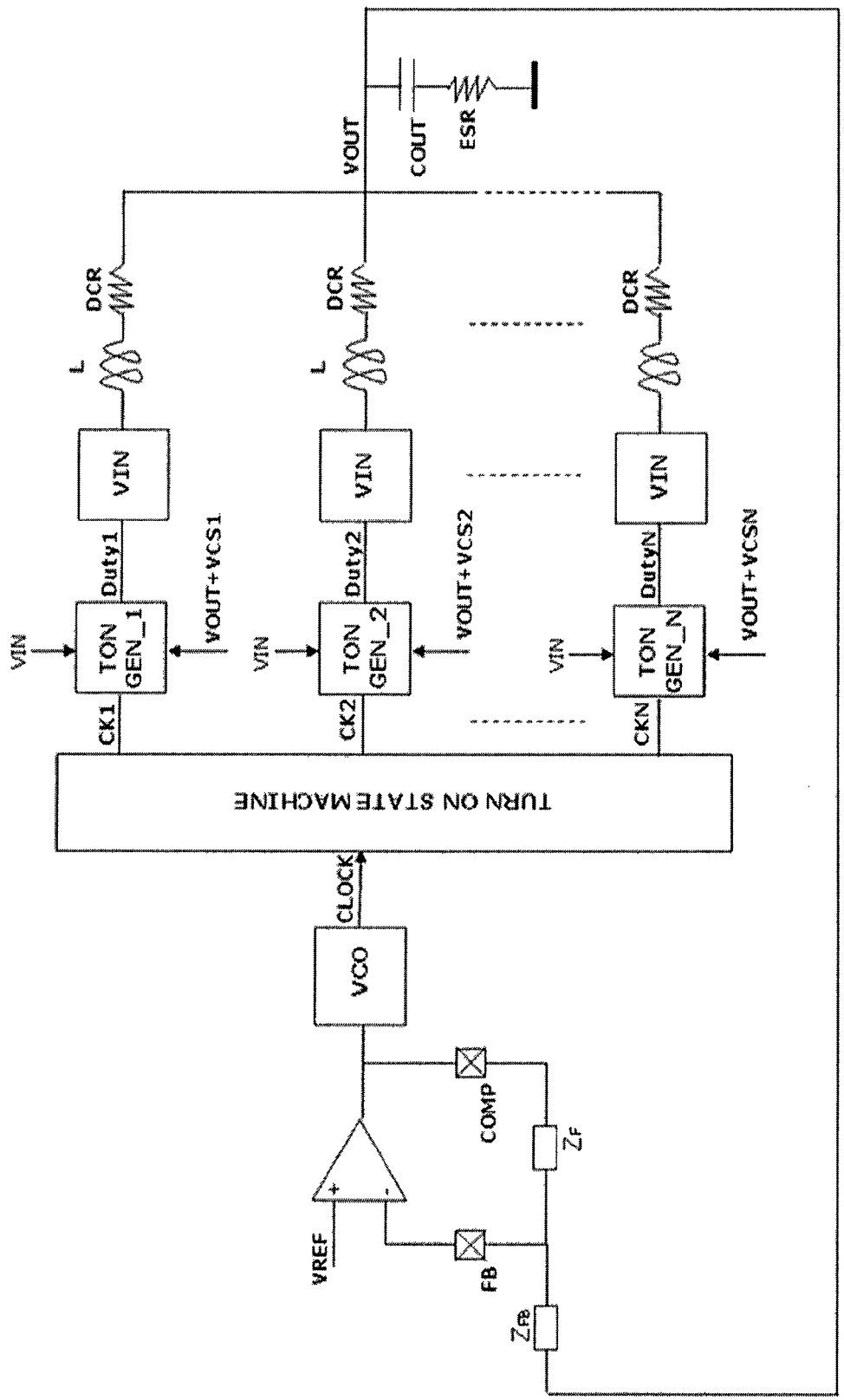
FIG. 1 shows a constant-on-time multiphase switching voltage regulator.
Figure 2:
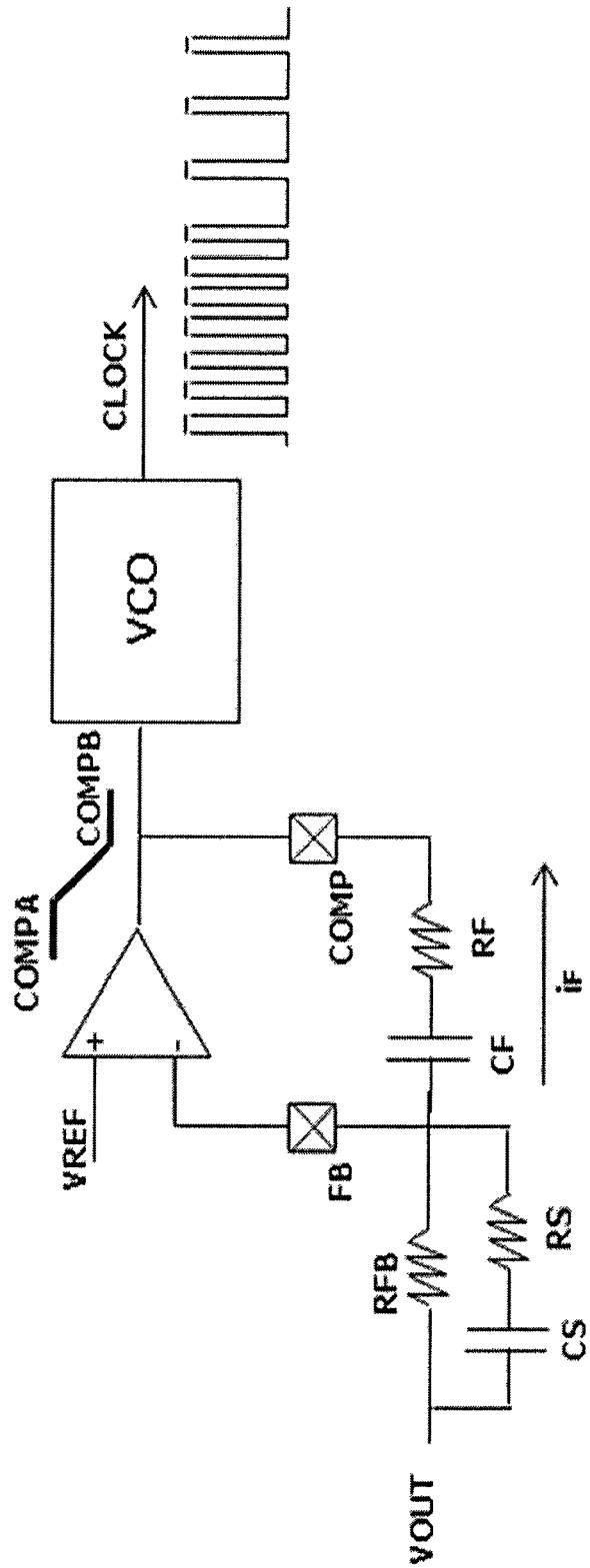
FIG. 2 is a detailed view of a portion of the regulator of FIG. 1 during a reduction of the number of active phases.
Figure 5:
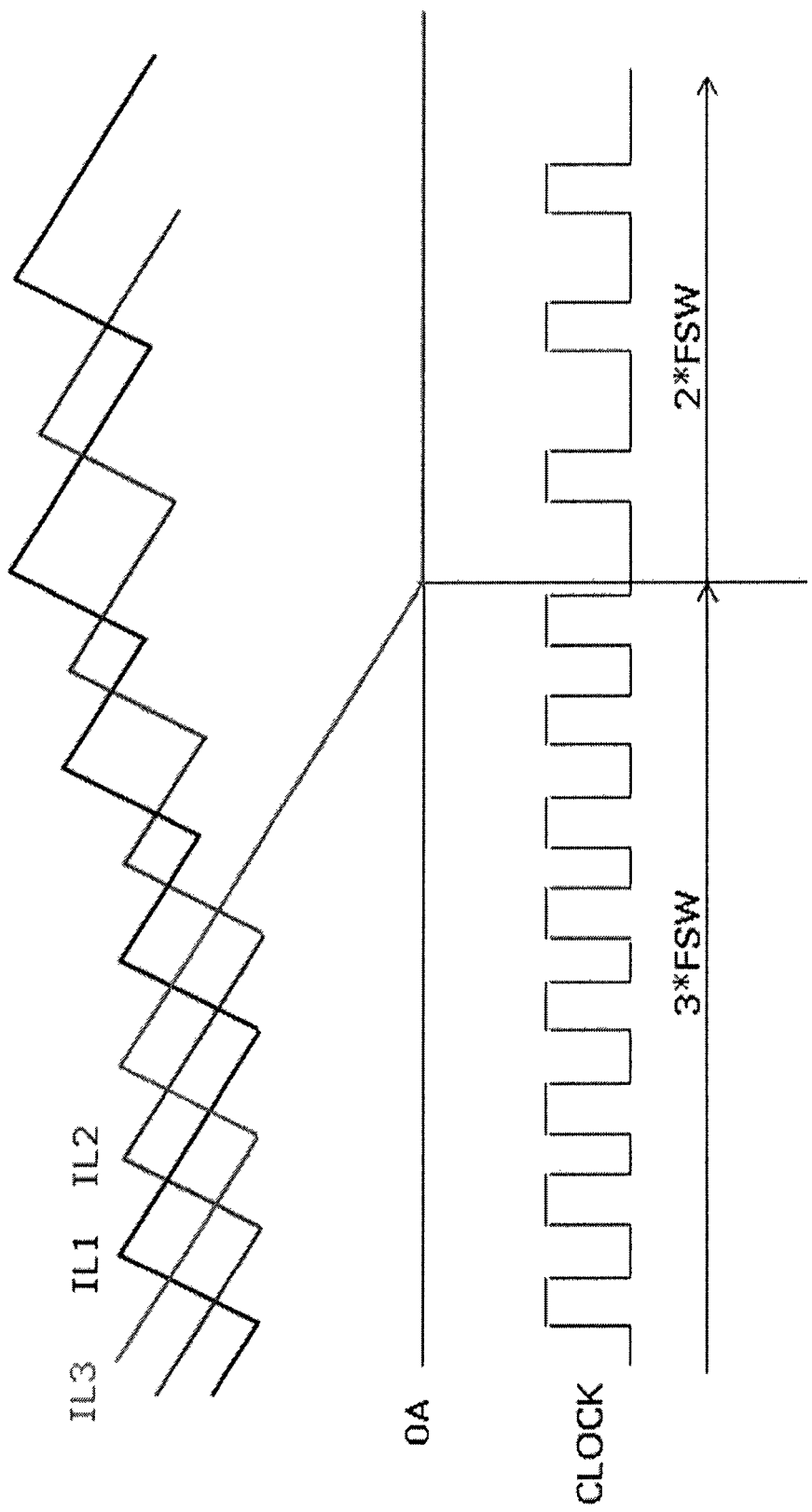
FIG. 5 is an exemplary time diagram of the phase currents and of the clock signal of a constant on time three-phase switching voltage regulator when a phase is being turned off.

Looking at the diagram of FIG. 5, that refers to a three-phase voltage regulator in the instant in which a phase is off, it is possible to notice that the clock frequency in ideal conditions should change from three times to two times the main switching frequency FSW in the instant in which the current IL3 of the phase to be turned off nullifies and the phase is disconnected. This cannot be obtained with the regulator of FIG. 1 because of the discharge time of the integrating network ZF, but it is possible in the architecture of FIG. 3 by adding an offset voltage VOFS of appropriate value from the turn off instant of the phase onwards.

Being $G_{VCO}$ the transfer function in the frequency domain of the Laplace transform, the voltage VCOMP on the terminal COMP and the main switching frequency FSW:

$$F_{SW} = V_{COMP} \cdot G_{VCO}$$

By multiplying the transfer function $G_{VCO}$ by the number of active phases, the voltage VCOMP would remain constant, but the loop gain would be significantly altered and thus also the bandwidth of the voltage regulator. This technique could cause instability problems or a too low response speed of the voltage regulator.

In order to address these issues, according to an embodiment a control voltage is generated for the VCO as the sum of an offset voltage VOFS with a voltage VCOMP and this control voltage is input to the VCO, that will generate a clock signal with a frequency $N*F_{SW}$ such that $$N \cdot F_{SW} = (V_{COMP} + V_{OFS}) \cdot G_{VCO}$$

being N the number of active phases.

Having fixed the main switching frequency FSW and the gain of the VCO, depending on the desired value for the voltage VCOMP it is possible to determine the offset voltage VOFS using the previous equation.

In particular, if:

$$V_{OFS} = \frac{N \cdot F_{SW}}{G_{VCO}}$$

it is VCOMP=0.

Considering that the regulated output voltage is substantially proportional to the voltage provided to the VCO, then:

$$G_{VCO} = \frac{F_{SW}}{V_{OUT} \cdot k}$$

being k a proportionality factor, thus:

$$V_{OFS} = N \cdot k \cdot V_{OUT}$$

From the previous equation it is possible to infer that by generating an offset voltage VOFS proportional to the number N of phases to be kept on and to the regulated output voltage VOUT, the voltage VCOMP on the terminal COMP is kept null. This offset voltage may be easily generated by means of an amplifier of the output voltage (see FIG. 10).

With this technique, it is possible to turn on/off any number of phases of a constant-on-time switching voltage regulator practically without generating overshoots/undershoots of the output voltage.

Figure 6:
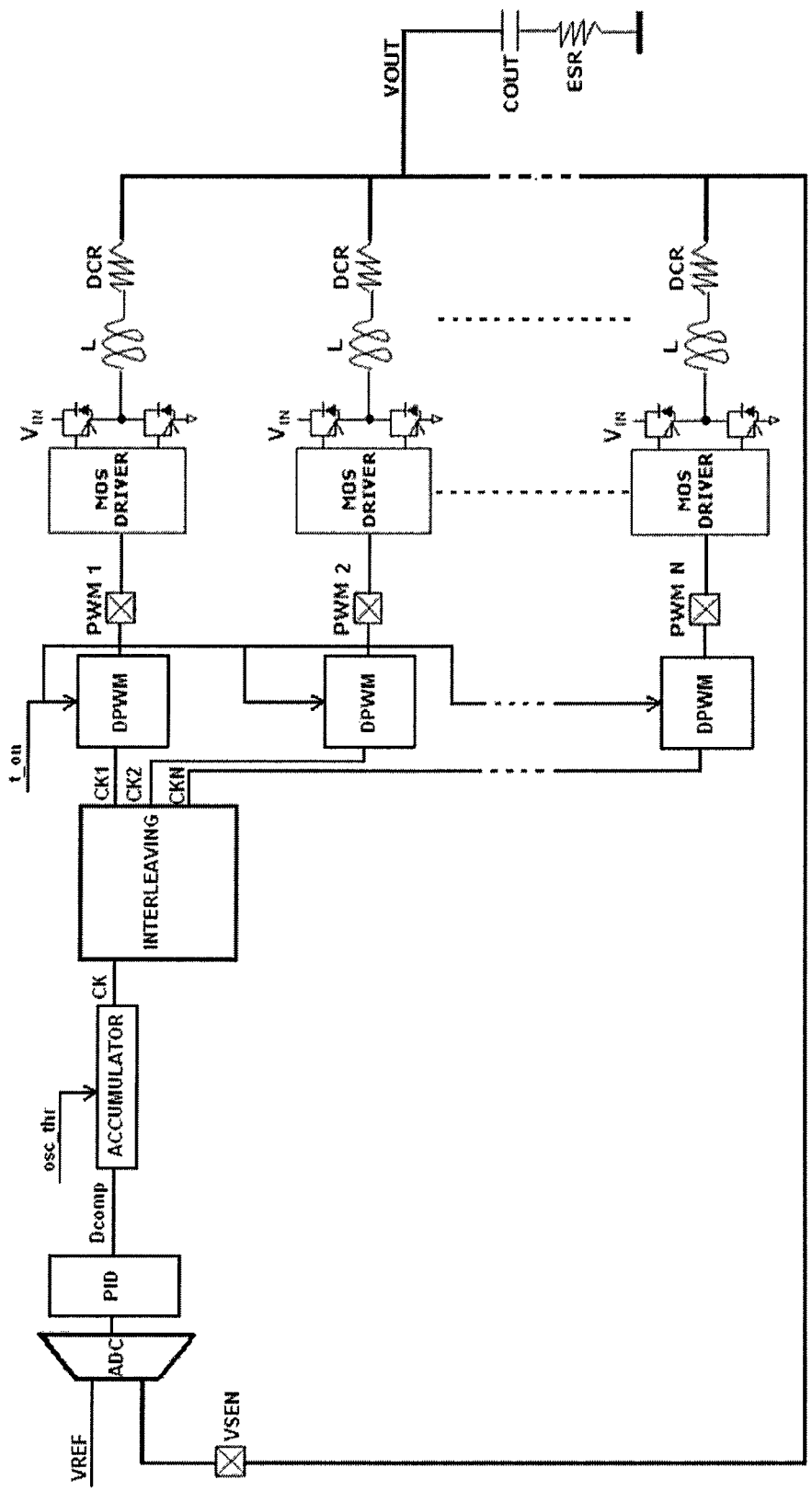
FIG. 6 shows a constant-on-time multiphase switching voltage regulator.

FIG. 6 shows a digital implementation of a constant-on-time multiphase switching voltage regulator in the form of a simplified block diagram of a digital N-phase buck converter driven by a PID.

Similarly to the analog system, also here it will be desired to change the number of phases, and then the switching frequency generated by the accumulator. So, also in this case the Dcomp is adjusted in order to generate the new frequency for the system, and this change cannot occur instantaneously but it will have a time constant which depends on the coefficients of the PID, and in particular on its integral component (corresponding to CF of the analog system). If the controller wants to decrease the number of phases, the Dcomp may take a long time to move to the new steady state value and the system may overshoot.

Figure 7:
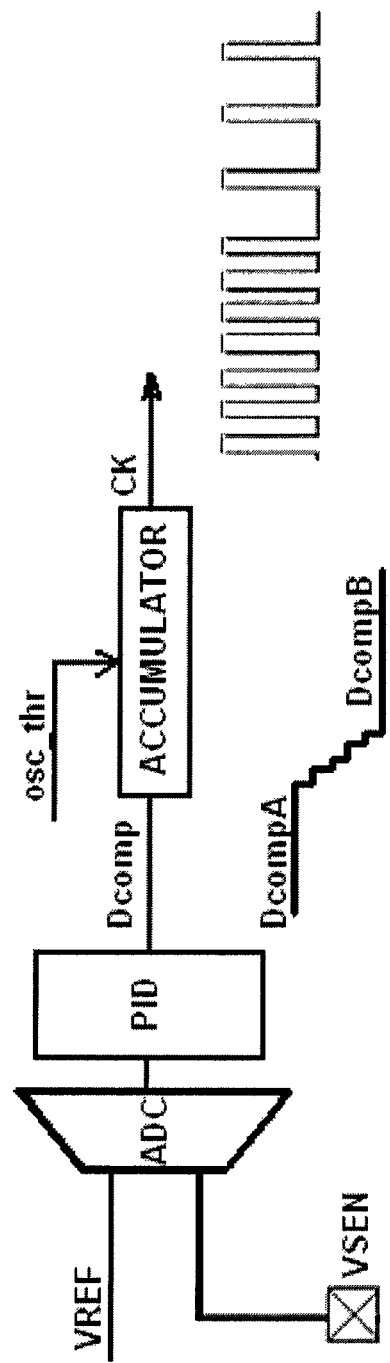
FIG. 7 is a detailed view of a portion of the regulator of FIG. 6 during a transition of the number of active phases.

FIG. 7 is a detailed view of a portion of the regulator of FIG. 6 during a transition of the number of active phases, which illustrates an example of this kind of transition. In this situation during the change of the equivalent switching frequency, the digital value of the Dcomp moves from DcompA to DcompB and during this transition the real switching frequency will be altered and this will generate a positive overshoot on the output voltage. Similarly, during the opposite transition, when the number of phases is increased, the system shows a similar behaviour with the generation of undershoot during the transition.

Figure 8:
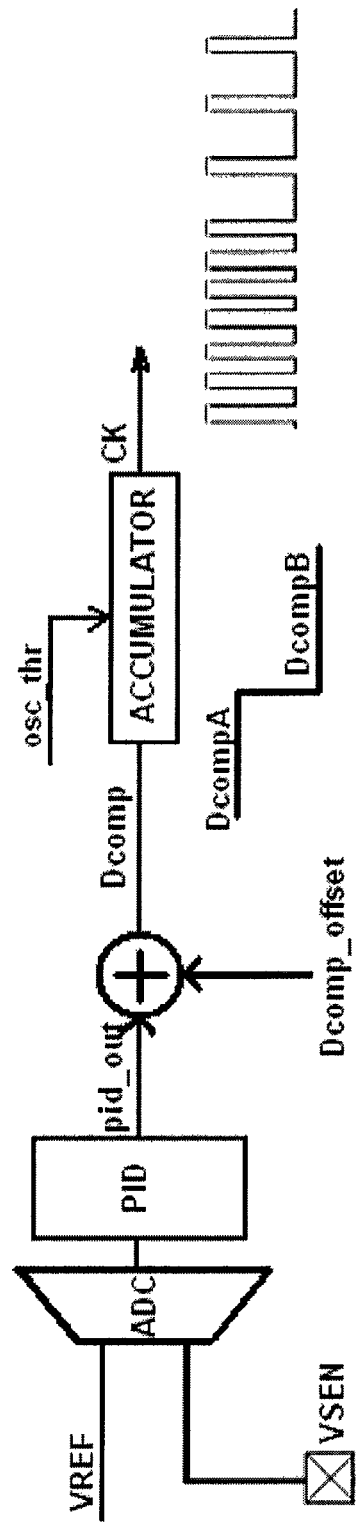
FIG. 8 illustrates a portion of an embodiment of a voltage regulator.

FIG. 8 illustrates a portion of an embodiment of a voltage regulator comprising an adder configured to generate a control signal Dcomp as a sum of an offset signal Dcomp_offset with a comparison signal pid_out, which facilitates faster response to changes in load conditions while reducing overshooting and undershooting of the regulated voltage.

An embodiment is configured to maintain substantially constant the value of the comparison signal pid_out) when a phase is turned on or off. As it has already been analyzed for the analog implementation, during the turning off of a phase, the desired instant of time to change the frequency of the multiphase system is when the phase that is being switched off reaches zero current and it is put in high impedance by the controller. In the same way of the analog implementation, it is proposed to artificially correct the input value of the accumulator by imposing an offset to Dcomp. In this way, the PID is not affected by the change in the number of phases and there is no substantial transition time.

Said Gacc, the transfer function from Dcomp during N*Fsw operation, it would be immediate to act on Gacc to keep constant the value of Dcomp according to number of phases, but this would alter the gain of the system:

$$N*F_{SW} = D_{COMP} \cdot G_{ACC}$$

Then:

$$N \cdot F_{SW} = (\text{pid\_out} + D_{COMP\_OFFSET}) \cdot G_{ACC}$$

Placing:

$$D_{COMP\_OFFSET} = \frac{N \cdot F_{SW}}{G_{ACC}}$$

We have:

pid_out=0 in steady state condition. This is the target.
Based on accumulator's threshold:

$$\frac{LSBadc\_vout * Dvout * Kosc * Nsw}{LSBadc\_err} = Dcomp \cdot \frac{Nsw}{N}$$

Then:

$$G_{ACC} = \frac{N \cdot F_{SW}}{Dcomp} = N \cdot F_{SW} \cdot \frac{LSBadc\_err}{LSBadc\_vout * Dvout * Kosc * N}$$

$$D_{COMP\_OFFSET} = \frac{LSBadc\_vout * Dvout * Kosc * N}{LSBadc\_err} = \frac{N * Dvout}{Kea}$$

Where Kea=LSBadc_err/(LSBadc_vout*Kosc)

So it is proposed to add this value to the output of the PID (which we have called Dcomp_offset), which basically depends on the number of phases and on the regulated voltage and is therefore easy to calculate digitally. In this way the output of the PID (pid_out in FIG. 8) will be almost constant and close to zero.

Figure 9:
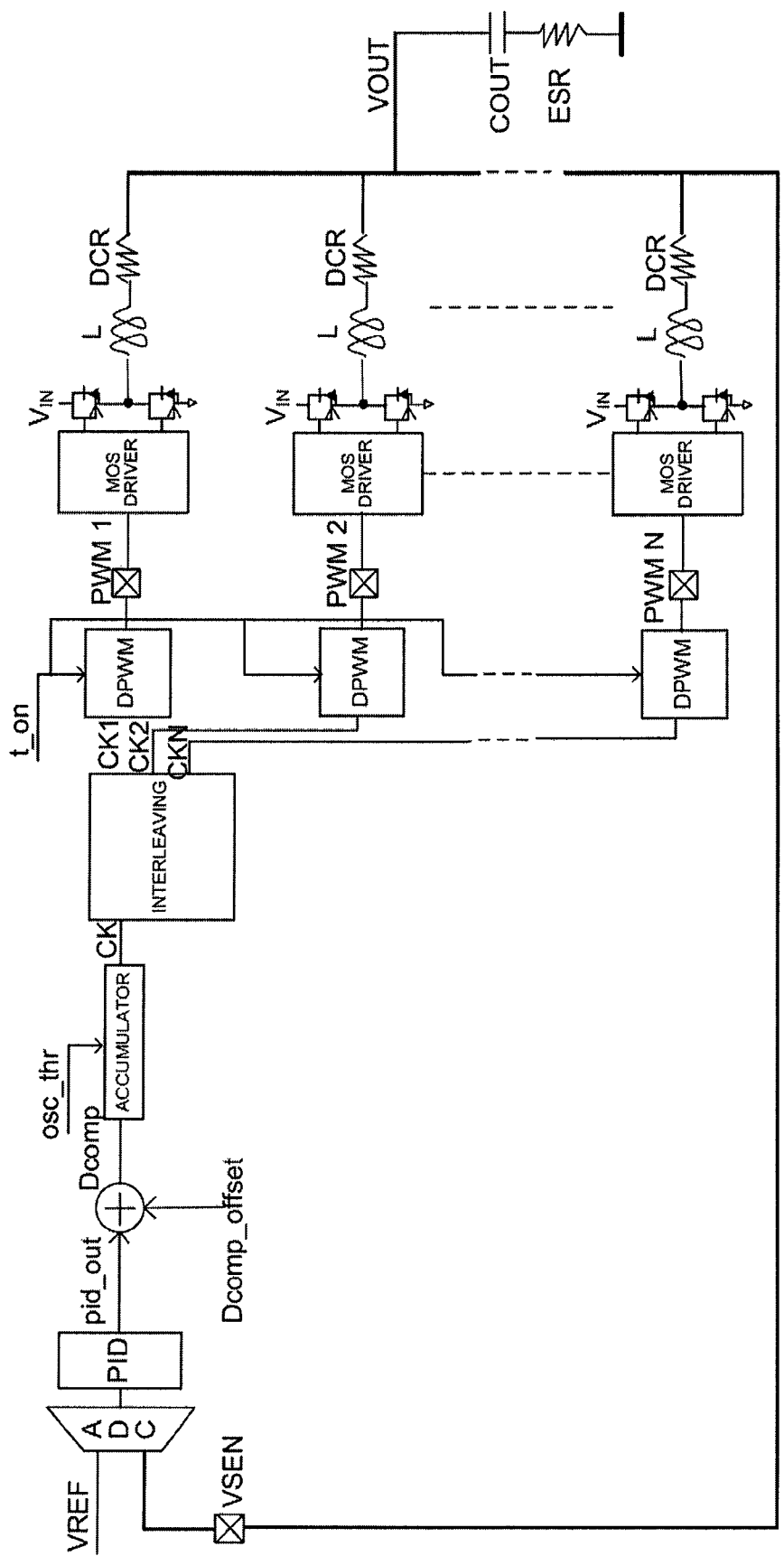
FIG. 9 illustrates an embodiment of a voltage regulator.

FIG. 9 illustrates an embodiment of a voltage regulator incorporating the adder of FIG. 8.

Figure 10:
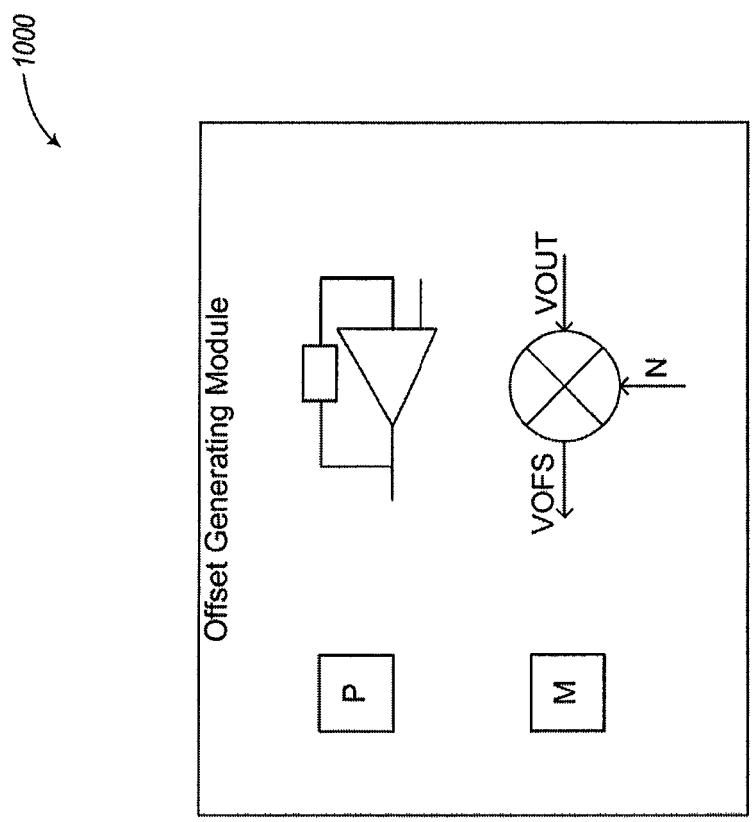
FIG. 10 illustrates an embodiment of an offset generating module.

FIG. 10 illustrates an embodiment of an offset generating module 1000 that may be employed, for example, by the embodiments illustrated in FIGS. 3 and 9, to generate the offsets. An offset generating module may comprise, for example, one or more processors, one or more memories, one or more discrete circuits, etc., and various combinations thereof. As illustrated, the offset generating module 1000 comprises a processor P, a memory M, and discrete circuitry, which as illustrated includes an amplifier and a multiplier. Embodiments may employ various combinations of processing devices and discrete circuitry to generate the offsets and/or to perform other functions. For example, the offset generating module may comprise and/or be integrated into a controller of a voltage regulator.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A switching voltage regulator, comprising:
 a comparison circuit configured to receive a reference voltage and a feedback voltage and to generate a comparison signal corresponding to a difference between the reference voltage and the feedback voltage;
 an offset circuit configured to generate an offset signal based on a product, the product being an output voltage of the voltage regulator multiplied by a number of active phases of the voltage regulator;
 an adder configured to generate a control signal based on the comparison signal and the offset signal;
 a plurality of pulse-width-modulated (PWM) power stages; and
 a controller configured to control the plurality of PWM power stages based at least in part on the control signal generated by the adder.

2. The switching voltage regulator of claim 1 wherein the comparison signal is a comparison voltage and the comparison circuit comprises an error amplifier configured to receive the reference voltage and the feedback voltage and to generate the comparison voltage.

3. The switching voltage regulator of claim 2, comprising a feedback impedance connected between an output terminal of the regulator and a feedback terminal of the error amplifier, and an integrating network connected between said feedback terminal and an output terminal of the error amplifier.

4. The switching voltage regulator of claim 3 wherein the offset signal is an offset voltage and the offset circuit is configured to receive an output voltage of the switching voltage regulator and to generate the offset voltage.

5. A switching voltage regulator, comprising:
 a comparison circuit configured to receive a reference voltage and a feedback voltage and to generate a comparison signal corresponding to a difference between the reference voltage and the feedback voltage;
 an offset circuit configured to generate an offset signal based on a product of an output voltage regulator and a number of active phases of the voltage regulators;

an adder configured to generate a control signal based on the comparison signal and the offset signal:
a plurality of pulse-width-modulated (PWM) power stages; and
a controller configured to control the plurality of PWM power stages based at least in part on the control signal generated by the adder, wherein the comparison signal is a comparison voltage, the comparison circuit comprises an error amplifier configured to receive the reference voltage and the feedback voltage and to generate the comparison voltage, the control signal is a control voltage, the offset signal is an offset voltage and the adder is configured to generate the control voltage as a sum of said comparison voltage and the offset voltage, wherein the controller comprises:
a voltage controlled oscillator configured to generate a train of pulses at a frequency based on said control voltage; and
a state machine configured to receive the train of pulses generated by said voltage controlled oscillator and to generate for each of active phase of the regulator a respective train of pulses obtained by frequency division of the received train of pulses.

6. The switching voltage regulator of claim 5 wherein the plurality of PWM power stages comprises:
a plurality of generators of PWM pulses, each connected such to drive a respective PWM power stage to supply a respective phase winding of the regulator.

7. A switching voltage regulator, comprising:
a comparison circuit configured to receive a reference voltage and a feedback voltage and to generate a comparison signal corresponding to a difference between the reference voltage and the feedback voltage;
an offset circuit configured to generate an offset signal based on a number of active phases of the voltage regulator;
an adder configured to generate a control signal based on the comparison signal and the offset signal;
a plurality of pulse-width-modulated (PWM) power stages; and
a controller configures to control the plurality of PWM power stages based at least in part on the control signal generated by the adder, wherein,
the comparison circuit comprises:
an analog-to-digital converter configured to receive the reference voltage and the feedback voltage; and
a proportional-integral-derivative (PID) controller configured to receive an output of the analog-to-digital converter and to generate the comparison signal; and
the controller comprises:
an accumulator configured to generate a train of pulses at a frequency based on said control signal; and
an interleaving oscillator configured to generate a plurality of pulse trains based on the train of pulses generated by the accumulator.

8. The switching voltage regulator of claim 7 wherein the offset circuit is configured to generate the offset signal based on the number of active phases of the voltage regulator, a gain of the accumulator and a switching frequency of the voltage regulator.

9. The switching voltage regulator of claim 7 wherein the offset circuit configured to generate the offset signal based on a gain of the accumulator and a switching frequency of the voltage regulator.

10. A method, comprising:
generating a regulated voltage which tracks a reference voltage using a constant-on-time switching voltage regulator by:
generating an offset signal based on a product, the product being the regulated voltage multiplied by a number N of active phases of the voltage regulator;
generating a comparison signal based on the reference voltage and a feedback voltage; and
generating a control signal based on the offset signal and the comparison signal.

11. The method of claim 10 wherein the offset signal is the product of the regulated voltage and the number of active phases of the voltage regulator.

12. A method, comprising:
generating a regulated voltage which tracks a reference voltage using a constant-on-time switching voltage regulator by:
generating an offset signal based on a number N of active phases of the voltage regulator;
generating a comparison signal based on the reference voltage and a feedback voltage; and
generating a control signal based on the offset signal and the comparison signal, wherein the offset signal is based on the regulated voltage output by the voltage regulator and the constant-on-time switching voltage regulator comprises:
an error amplifier configured to receive on an input terminal said reference voltage and on another input terminal the feedback voltage available on a feedback terminal of the regulator, and to generate on a comparison terminal a comparison voltage corresponding to a difference between the reference voltage and the feedback voltage;
an adder configured to generate a control voltage as sum of said comparison voltage and an offset voltage;
a voltage controlled oscillator controlled by said adder, configured to generate a train of pulses at a frequency determined by said control voltage;
a state machine configured to receive the train of pulses generated by said voltage controlled oscillator, and to generate for each of active phase of the regulator a respective train of pulses obtained by frequency division by N of the received train of pulses;
a plurality of generators of PWM pulses, each configured to drive a respective PWM power stage;
a feedback impedance connected between an output terminal and a feedback terminal of the error amplifier; and
an integrating network connected between said feedback terminal and an output of the error amplifier.

13. The method of claim 12 wherein the offset signal is an offset voltage proportionally to said regulated voltage with a proportionality factor based on the number of active phases of the regulator.

14. The method of claim 13 wherein the proportionality factor is determined such to keep substantially constant a voltage drop on said integrating network when at least a phase of the regulator is turned on or off.

15. The method of claim 13, comprising updating the value of said proportionality factor each time that at least a phase of the voltage regulator is turned on or off.

16. A method, comprising:
generating a regulated voltage which tracks a reference voltage using a constant-on-time switching voltage regulator by:
generating an offset signal based on a number N of active phases of the voltage regulator;

generating a comparison signal based on the reference voltage and a feedback voltage;
generating a control signal based on the offset signal and the comparison signal; and
turning off a phase in an instant in which current flowing through a respective winding nullifies.

17. A method, comprising:
generating a regulated voltage which tracks a reference voltage using a constant-on-time switching voltage regulator by:
generating an offset signal based on a number N of active phases of the voltage regulator;
generating a comparison signal based on the reference voltage and a feedback voltage; and
generating a control signal based on the offset signal and the comparison signal, wherein the voltage regulator comprises:
an analog-to-digital converter configured to receive the reference voltage and the feedback voltage;
a proportional-integral-derivative (PID) controller configured to receive an output of the analog-to-digital converter and to generate the comparison signal;
an adder configured to generate the control signal based on the comparison signal and the offset signal;
an accumulator configured to generate a train of pulses at a frequency based on said control signal; and
an interleaving oscillator configured to generate a plurality of pulse trains based on the train of pulses generated by the accumulator.

18. The method of claim 17 wherein the offset signal is inversely proportional to a gain of the accumulator and directly proportional to a switching frequency and the number of active phases of the voltage regulator.

19. A system, comprising:
a processor; and
a switching voltage regulator configured to provide power to the processor and including:
a comparison circuit configured to receive a reference voltage and a feedback voltage and to generate a comparison signal corresponding to a difference between the reference voltage and the feedback voltage;
an offset circuit configured to generate an offset signal based on a number of active phases of the voltage regulator;
an adder configured to generate a control signal based on the comparison signal and the offset signal;
a plurality of pulse-width-modulated (PWM) power stages; and
a controller configured to control the plurality of PWM power stages based at least in part on the control signal generated by the adder, wherein the offset circuit is configured to generate the offset signal based on at least one of:
an output voltage of the voltage regulator multiplied by the number of active phases of the voltage regulator; and
a gain of an accumulator and a switching frequency of the voltage regulator.

20. The system of claim 19 wherein the comparison signal is a comparison voltage and the comparison circuit comprises an error amplifier configured to receive the reference voltage and the feedback voltage and to generate the comparison voltage.

21. The system of claim 20 wherein the control signal is a control voltage, the offset signal is an offset voltage, the adder is configured to generate the control voltage as a sum of said comparison voltage and the offset voltage, and the controller comprises:

a voltage controlled oscillator configured to generate a train of pulses at a frequency based on said control voltage; and
a state machine configured to receive the train of pulses generated by said voltage controlled oscillator and to generate for each of active phase of the regulator a respective train of pulses obtained by frequency division of the received train of pulses.

22. The system of claim 20, comprising a feedback impedance connected between an output terminal of the regulator and a feedback terminal of the error amplifier, and an integrating network connected between said feedback terminal and an output terminal of the error amplifier.

23. The system of claim 22 wherein the offset circuit is configured to generate the offset signal by multiplying the output voltage of the switching voltage regulator by the number of active phases of the voltage regulator.

24. A system, comprising:
a processor; and
a switching voltage regulator configured to provide power to the processor and including:
a comparison circuit configured to receive a reference voltage and a feedback voltage and to generate a comparison signal corresponding to a difference between the reference voltage and the feedback voltage;
an offset circuit configured to generate an offset signal based on a number of active phases of the voltage regulator;
an adder configured to generate a control signal based on the comparison signal and the offset signal;
a plurality of pulse-width-modulated (PWM) power stages; and
a controller configured to control the plurality of PWM power stages based at least in part on the control signal generated by the adder, wherein the comparison circuit comprises:
an analog-to-digital converter configured to receive the reference voltage and the feedback voltage; and
a proportional-integral-derivative (PID) controller configured to receive an output of the analog-to-digital converter and to generate the comparison signal.

25. The system of claim 24 wherein the controller comprises:
an accumulator configured to generate a train of pulses at a frequency based on said control signal; and
an interleaving oscillator configured to generate a plurality of pulse trains based on the train of pulses generated by the accumulator.

26. The system of claim 25 wherein the offset signal is inversely proportional to a gain of the accumulator and directly proportional to a switching frequency and number of active phases of the voltage regulator.

27. A system, comprising:
means for generating a comparison signal based on a reference voltage and a feedback voltage;
means for generating a voltage regulator control signal based on an offset signal and the comparison signal; and
means for generating the offset signal, wherein the means for generating the offset signal generated the offset signal based on at least one of:
a voltage regulator output multiplied by a number of active phases of the voltage regulators; and
a gain of an accumulator, a switching frequency of the voltage regulator and the number of active phases of the voltage regulator.

28. The system of claim 27, further comprising a voltage controlled oscillator, wherein the means for generating the offset signal comprises a multiplier configured to multiply the voltage regulator output by the number of active phases.

29. The system of claim 27, further comprising the accumulator, wherein the means for generating the offset signal is configured to generate the offset signal based on the gain of the accumulator and the switching frequency of the voltage regulator.

* * * * *

UNITED STATES PATENT AND TRADEMARK OFFICE
CERTIFICATE OF CORRECTION

PATENT NO. : 8,981,743 B2  
APPLICATION NO. : 13/544786  
DATED : March 17, 2015  
INVENTOR(S) : Osvaldo Enrico Zambetti et al.

Page 1 of 1

It is certified that error appears in the above-identified patent and that said Letters Patent is hereby corrected as shown below:

In the claims

Column 11, Line 43, Claim 7:
"a controller configures to control the plurality of PWM" should read, --a controller configured to control the plurality of PWM--.

Column 14, Line 59, Claim 27:
"for generating the offset signal generated the offset" should read, --for generating the offset signal generates the offset--.

Column 14, Line 62, Claim 27:
"active phases of the voltage regulators; and" should read, --active phases of the voltage regulator; and--.

Signed and Sealed this
Twenty-seventh Day of October, 2015

Michelle K. Lee
*Director of the United States Patent and Trademark Office*